United States Patent [19]

Esbensen

[11] 4,196,529
[45] Apr. 8, 1980

[54] TEACHING DEVICE AND METHOD

[75] Inventor: Thorwald Esbensen, Edina, Minn.

[73] Assignee: Follett Publishing Company, Chicago, Ill.

[21] Appl. No.: 930,149

[22] Filed: Aug. 2, 1978

[51] Int. Cl.² .................. G09B 17/00; G09B 19/00
[52] U.S. Cl. ................................ 35/35 H; 35/48 A
[58] Field of Search ............ 35/48 A, 48 R, 9 E, 35/9 R, 31 F, 35 H, 35 R

[56] References Cited

U.S. PATENT DOCUMENTS

| | | | |
|---|---|---|---|
| 2,835,989 | 5/1958 | Arrowsmith et al. | 35/48 A |
| 2,971,268 | 2/1961 | Zimmerman | 35/9 R |
| 3,359,651 | 12/1967 | Mair | 35/9 R |
| 3,510,961 | 5/1970 | Hawkins | 35/9 E |

FOREIGN PATENT DOCUMENTS 1239027 7/1971 United Kingdom ............ 35/2

*Primary Examiner*—John W. Shepperd
*Attorney, Agent, or Firm*—Wallenstein, Spangenberg, Hattis & Strampel

[57] ABSTRACT

A teaching device especially suitable for use in teaching reading at the elementary school level. The device, in its preferred form, comprises a lesson sheet on one side of which words are arranged in a preselected pattern. A window card is provided and is adapted to be superimposed on the lesson sheet. One of the windows in the window card has indicia along each of its margins which can be correlated with words on the lesson sheet. When a correct correlation has been made, a correct answer reinforcement in the form of a symbol such as a star appears through another window in the window card. The back of the lesson sheet advantageously has increments of information arranged thereon in a preselected pattern which correspond to the words appearing on the front of the lesson sheet. The same side of the lesson sheet also provides means for enabling a student to write each of the words appearing on the front of the lesson sheet. By correlating the indicia along the margins of the said one window in the window card with window orientation guide means on the back of the lesson sheet, the individual letters comprising the words on the front of the lesson sheet will appear in separate windows in the window card to give a correct answer reinforcement. The device is a valuable aid in enabling a student to associate certain letter arrangements with their corresponding sound patterns.

10 Claims, 10 Drawing Figures

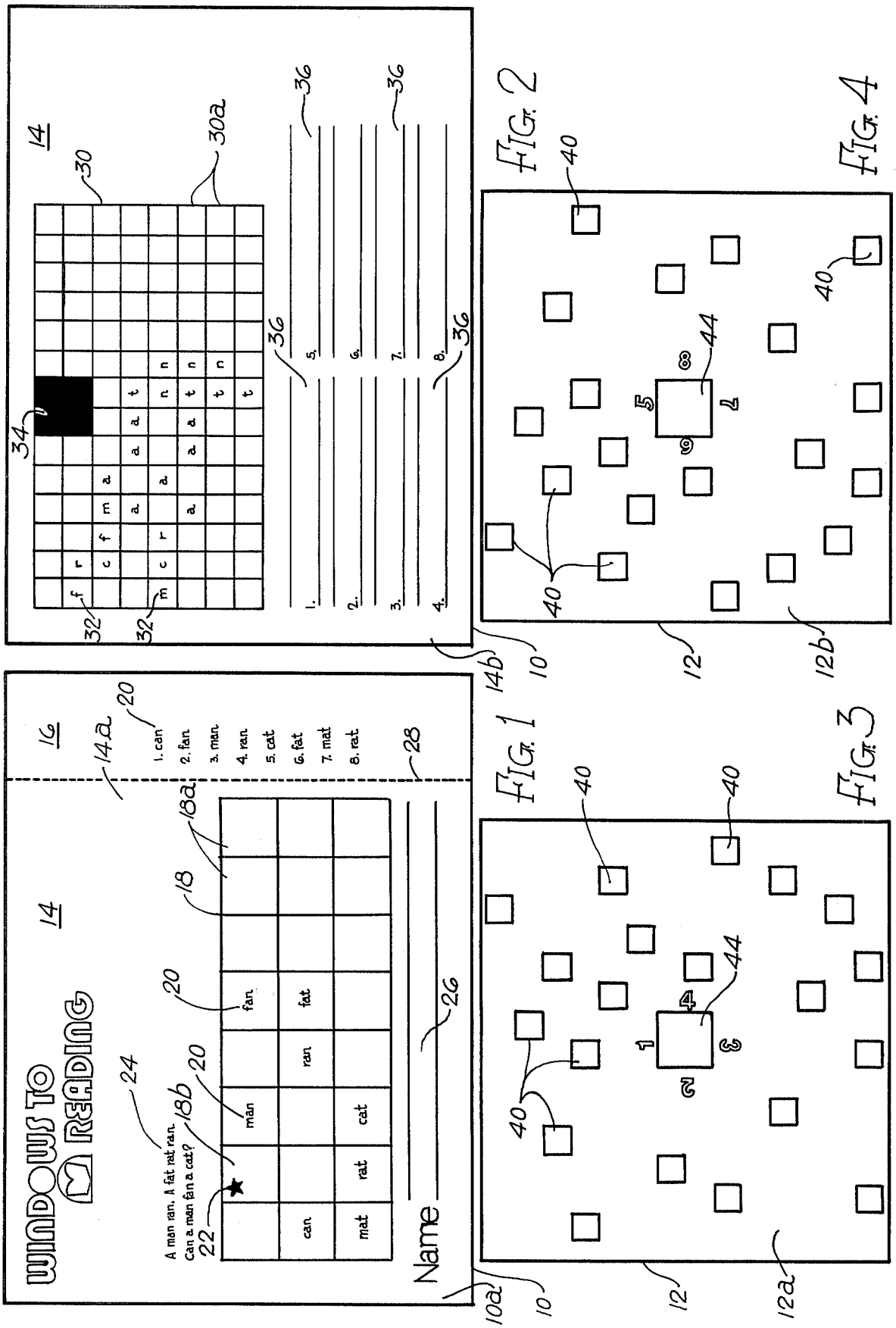

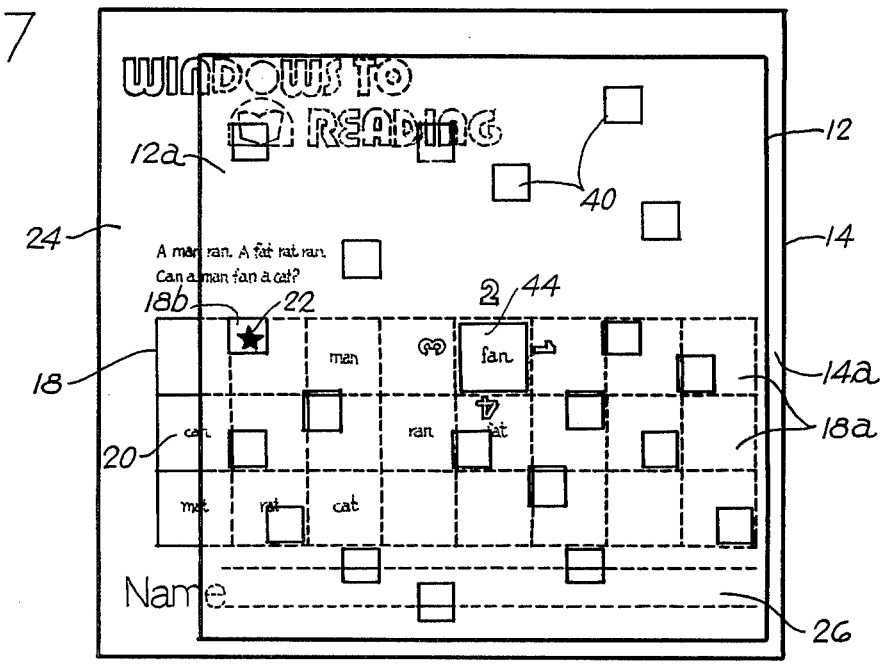
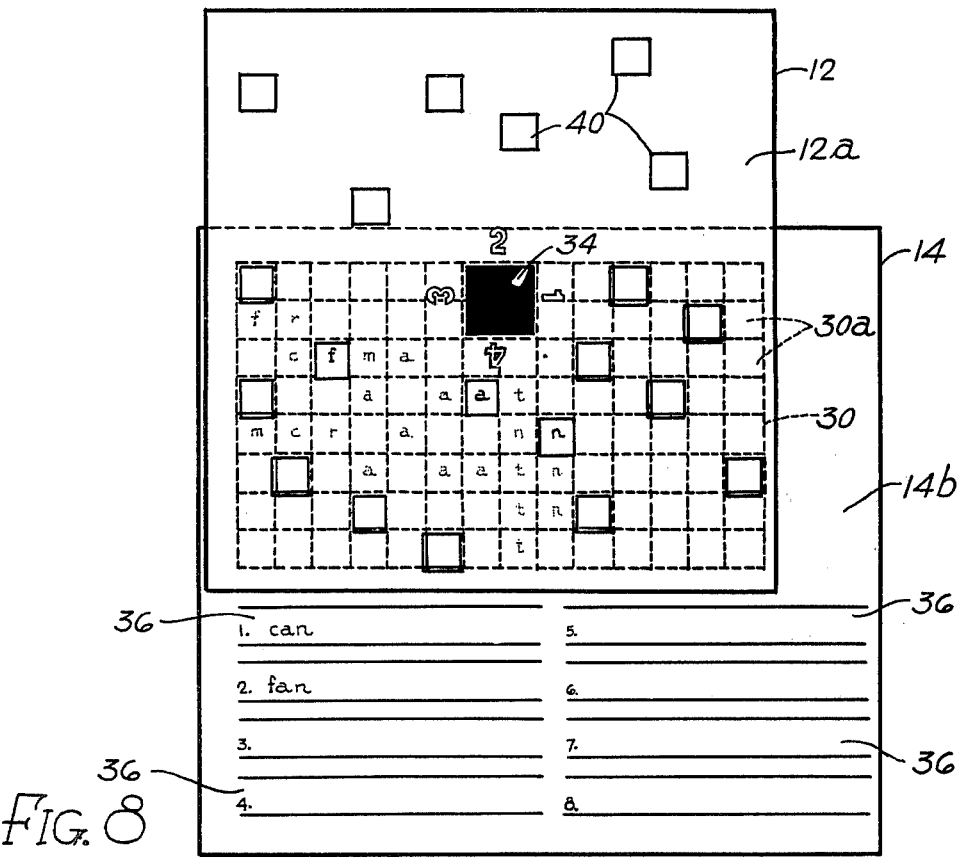

TEACHING DEVICE AND METHOD

The present invention relates to a teaching device, and, in particular, to an easily hand manipulable teaching device especially useful as a means for supplementing standard materials employed to teach reading at the elementary level.

Programmed teaching devices have, for many years, been recognized as important educational tools. Devices of this type have taken various forms ranging from simple flash cards to complete electronic machines. Flash cards usually have a single increment of information imprinted thereon, and, therefore, are cumbersome both to handle and store. Electronic devices, on the other hand, are costly hand, therefore, are beyond the reach of many school district budgets. In between these extremes are specialized, hand manipulated teaching devices which employ a plurality of interconnected, information-bearing elements. Wholly apart from their relatively high cost, the manipulation of the various elements comprising these devices more frequently than not requires mechanical skills beyond the comprehension and capabilities of the user.

In accordance with the present invention, an improved teaching device has been evolved which not only is easy to use, even by a pupil possessing minimal manual dexterity, and which can be manufactured and sold at a cost well within the budget of substantially any school district, but, also, provides a significant adjunct to a basal reading test which enables the establishment of a cooperative teacher-pupil interplay for effectively demonstrating to, and instilling in, a pupil that there is a dependable, consistent relationship between the sounds of the English language and the manner in which those sounds are represented in written or printed words.

The teaching device, in brief, comprises a first member, or lesson sheet, and a second member, or window card, which is adapted to be superimposed on the lesson sheet. The lesson sheet comprises a work sheet portion and a lesson guide portion, or audio strip, which is separable from the worksheet portion of the lesson sheet and is used by a teacher to lead a pupil through the material on the lesson sheet. Increments of information, in the form of words, and the letters comprising those words, are arranged in a preselected pattern on the front and back, respectively, of the lesson sheet. The window card has a plurality of windows formed therein which also are arranged in a predetermined pattern. In a preferred embodiment of the device, one of the windows in the window card is enlarged and has indicia, such as numerals, imprinted along each of its margins on the front and the reverse side of the window card. When the enlarged window is properly oriented with respect to an increment of information on the front of the worksheet portion of the lesson sheet, a symbol such as a star, for example, imprinted on the worksheet portion, will be visible through another window in the window card to provide instant correct answer reinforcement for the pupil. The positioning of the other windows in the window card with relation to the enlarged window is such that the star will appear in a different window for each correct correlation made by a pupil between a word on the front of the worksheet portion of the lesson sheet and the indicia along the margins of the enlarged window. Thus, a pupil will not become conditioned to viewing the symbol is any one particular window, a factor which adds to the pupil's interest as the lesson progresses. The window card also is used to correlate increments of information on the back or reverse side of the worksheet, and can be used in conjunction with more than one lesson sheet even though the increments of information on each lesson sheet differ from those on any other sheet and are differently arranged on each lesson sheet. A single window card, therefore, can be used for an entire reading program which may consist of over a hundred different lesson sheets.

The foregoing and other objects, advantages and features of the invention will become apparent upon making reference to the specification to follow, the claims and the drawings wherein:

FIG. 1 is a view of the front or face of a typical lesson sheet comprising an embodiment of the teaching device of the present invention;

FIG. 2 is a view of the back or reverse side of the lesson sheet shown in FIG. 1;

FIG. 3 is a view of the front or face of a window card comprising said embodiment of the invention;

FIG. 4 is a view of the back or reverse side of the window card shown in FIG. 3;

FIGS. 7 and 8 are views corresponding to the views shown in FIGS. 5 and 6, except that a different word is the subject under consideration;

Figure 5:
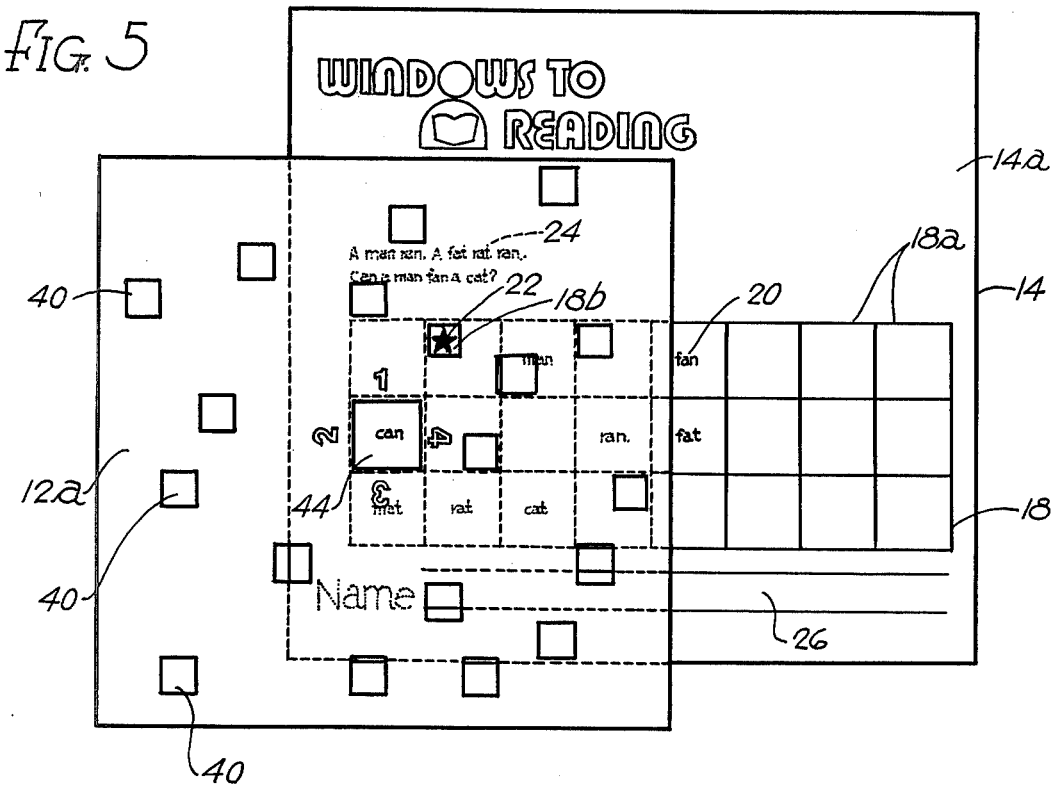
FIG. 5 is a view showing the window card properly oriented on the front of the lesson sheet and a correct answer being indicated by a star which is visible through a window in the window card.

Referring, now, in greater detail to FIGS. 1-4 of the drawings, the embodiment of the teaching device illustrated comprises a first member, or lesson sheet 10, and a second member, or window card 12. The front or face 10a of the lesson sheet 10 includes a worksheet portion 14 and a student guide portion, or audio strip 16. The worksheet portion 14 has a grid 18 formed on the front or face 14a thereof. The grid 18 consists of square-shaped areas or boxes 18a in which words 20 are imprinted in a preselected arrangement or pattern. One area or box 18b of the grid 18 has a star 22 imprinted therein, the purpose of which will become clear as the description proceeds. Above and adjacent to the grid 18, sentences 24 are provided containing the words 20 appearing in the boxes 18a of the grid 18, and on the audio strip 16. The front 14a of the worksheet portion 14 also provides a space 26 for the student's name.

The audio strip 16 of the lesson sheet 10, as shown, is joined to the worksheet portion 14 of the lesson sheet along a dotted or perforated line 28, and has printed thereon, in a column, the words 20 which appear in the boxes 18a of the grid 18. Each of the words on the audio strip 16 is numbered for reasons that will be made clear later in the description. The audio strip 16 is separated from the worksheet portion 14 of the lesson sheet along the line 28 at the beginning of a lesson, and, as shall be explained hereinafter, is used by the teacher, or a person assuming the role of a teacher, to guide a student through the lesson.

The back or reverse side 14b of the worksheet portion 14, as shown in FIG. 2, has a grid 30 imprinted thereon which is comprised of areas or boxes 30a smaller in size than the boxes 18a of the grid 18. Preselected boxes of the grid 30 have printed therein a letter 32 comprising one of the words 20 appearing in both the boxes 18a of the grid 18 and in the column of words on the audio strip 16. In the upper portion of the grid 30, between the ends or sides thereof, a window card guide zone or box 34 is provided. Below the grid 30, two columns of numbered spaces 36 are provided for enabling a student to write each of the correspondingly numbered words 20 which are printed in the grid 18 and on the audio strip 16.

The window card 12, as illustrated in FIGS. 3 and 4, has a front or face side 12a and a back or reverse side 12b. The window card 12 has a plurality of windows 40 formed therein which are arranged in a preselected pattern around a larger, substantially square, centrally positioned orientation window 44. A number, selected from the series 1 through 8, and corresponding to the numbers identifying the words 20 on the audio strip 16, is printed along each of the four margins of the window 44 on the front and reverse sides of the card 12. In the embodiment of the card 12 illustrated, twenty of the windows 40 are provided in the window card 12. Since the card 12 can be oriented in eight different positions as determined by the numbers 1 through 8 along the margins of the orientation window 44 on the front and reverse sides of the card 12, by proper arrangement of the words 20 on the grid 18, and the letters 32 on the grid 30, the card 12 can be used in conjunction with well over one hundred different lesson sheets.

In utilizing the device of the present invention, the teacher, or a person acting in that capacity, first cuts off the audio strip 16 from the lesson sheet 10, and hands the worksheet portion 14 of the lesson sheet and the window card 12 to the student or learner. The teacher retains the audio strip 16. The student places the worksheet 14 on a flat surface, and enters his or her name on the line 26 of the front 14a of the worksheet 14. The teacher then reads the first word of the column of words appearing on the audio strip 16. The student after hearing the word, places the orientation window 44 of the window card 12, with the numeral 1 at the top, over the box 18a of the grid 18 containing the word "can" as shown in FIG. 5. If the student has identified the word on the worksheet correctly, the star 22 will appear in one of the windows 40 of the window card 12. Thus, the student receives an immediate correct answer reinforcement. The teacher than reads the second word, "fan," on the audio strip 16. This time the student turns the window card 12 so that the number 2 is at the top of the orientation window 44, and then places the window 44 over the box 18a containing the word "fan" in the grid 18 as shown in FIG. 7. As before, a correct correlation between the number at the top of the window 44 and the word in the box of the grid 18 will elicit a correct answer reinforcement by the appearance of the star 22 in one of the windows 40 of the card 12. After the first four words on the audio strip 16 have been read off by the teacher, the student turns the window card 12 over, and proceeds as before with the words numbered 5-8.

Figure 9:
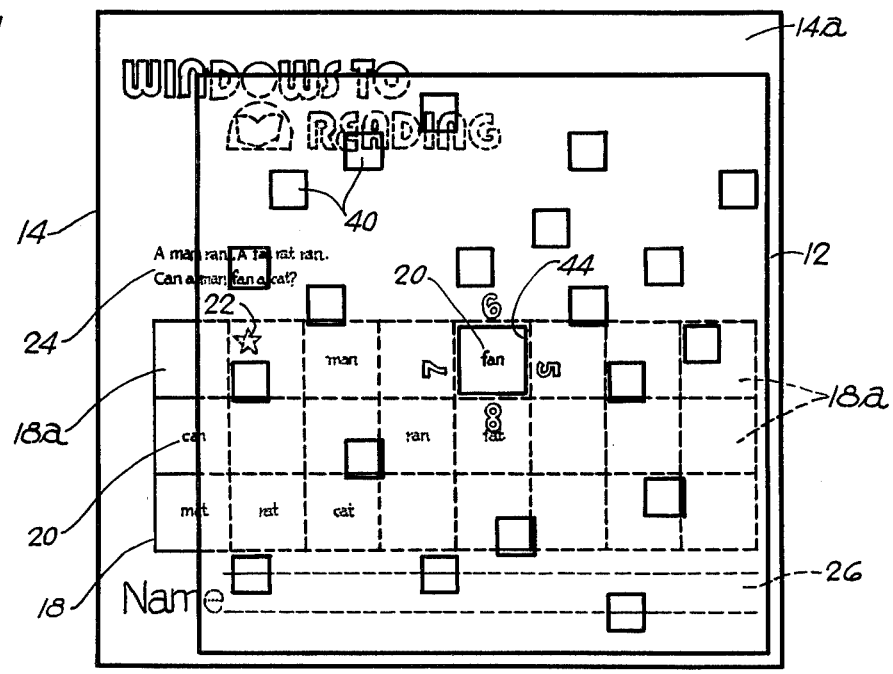
FIG. 9 is a view showing the window card improperly oriented with relation to a word on the face of the lesson sheet.

If the student for some reason does not correctly orient the window 44 with a word on the grid 18, the star 22 will not appear in any of the windows 40 of the card 12. Thus, as shown in FIG. 9, the window 44, with the side thereof numbered "6" at the top, has been placed over the word "fan" on the grid 18. The word "fan," however, is the second word on the audio strip 16. Therefore, the star 22 is masked from view by the card 12. If such an incorrect response occurs, the teacher repeats the word until the student identifies it correctly on the grid 18 using the window card 12.

Figure 6:
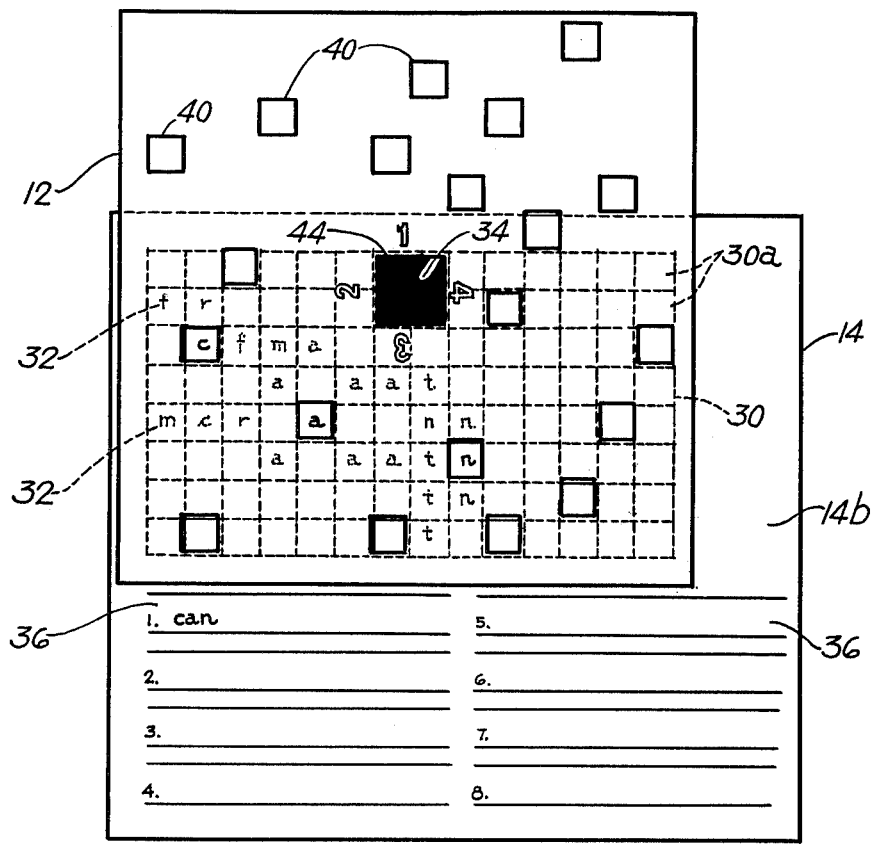
FIG. 6 is a view showing the window card properly oriented on the reverse side of the lesson sheet with the letters of the word under consideration being visible through windows in the window card.
Figure 10:
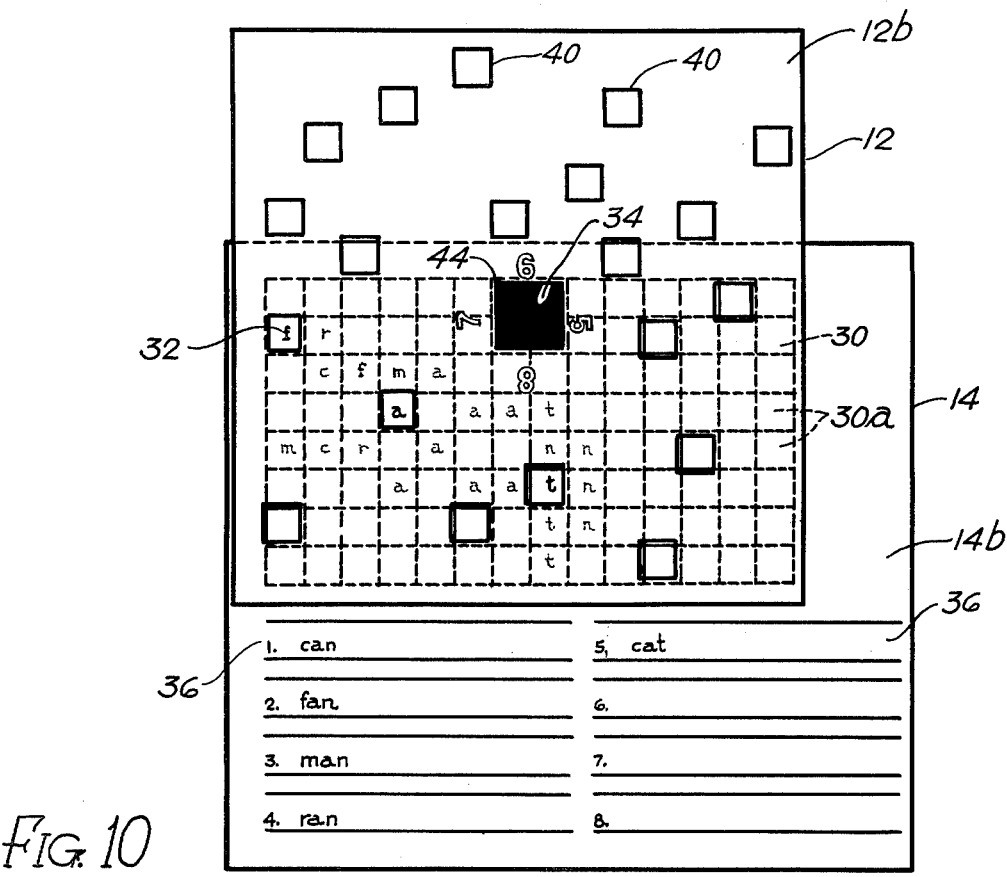
FIG. 10 is a view showing the window card improperly oriented on the reverse side of the lesson sheet.

Following correct identification by the student of all of the words on the audio strip 16 as they are read by the teacher in the order in which they appear thereon, the student turns the worksheet 14 over. The teacher then reads the first word, that is, "can" on the audio strip 16. The student writes the word in the space 36 numbered "1" as shown in FIG. 6. Then, once again holding the window card 12 with the number 1 at the top of the orientation window 44, the student places the window 44 directly over the window card guide box 34 of the grid 30. The letters "c-a-n" will appear in three of the windows 40 of the card 12 (see FIG. 6). Thus, the student can immediately check to determine whether the word as written in the space 36 corresponds to the letters as they appear in the three boxes 40 of the card 12. If the word has been misspelled, it is corrected at that time. The teacher then reads the next word, that is, "fan" from the audio strip 16, and the student again writes the word in the appropriate space 36 below the grid 30 (see FIG. 8). The student then orients the window 44 so that the numeral "2" appears at the top of the window 44, and, as before, places the window 44 over the guide box 34 of the grid 30. A correct correlation will result in the letters "f-a-n" appearing in three windows 40 of the card 12 (see FIG. 8). The same procedure is followed for all of the words on the audio strip 16. If the student makes an incorrect correlation between the number at the top of the window 44 and the number of a word written in one of the spaces 36 below the grid 30, a different set of letters will appear in the three boxes 40. Thus, as shown in FIG. 10, the window 44 has been oriented with relation to the window card guide box 34 with the numbered side "6" at the top instead of the number "5," the word "cat" being the fifth word on the audio strip 16. Therefore, the student, instead of seeing the letters "c-a-t" appear in the boxes 40 of the window card 12, sees the letters "f-a-t" which is the sixth word on the audio strip 16. The student can then make an immediate adjustment by turning the window card 12 to correct the orientation.

After all of the words have been read from the audio strip 16, the student turns the worksheet 14 over so that the front 10a thereof is again facing upward. The student is then asked to read the three sentences 24 that are printed above and to the left of the grid 18, as illustrated in FIG. 1, and, in addition, to read all of the words 20 that appear in the boxes 18a of the grid 18. If the student cannot successfully read the sentences and the words, the entire lesson is repeated.

As stated hereinabove, the primary purpose of the device of the present invention is to provide students with dependable sound/symbol correspondences or relationships. Therefore, the words comprising each lesson are presented in a straight-forward manner. There are no tricks, no exceptions, no surprises to undermine a student's confidence in his or her ability to learn to read as the student progresses from one lesson to the next. The simple construction of the device, and its easy manipulability enhance and augment its unique utility as an aid in teaching reading.

While the invention has been illustrated and described with relation to a preferred embodiment thereof, it should be understood that variations and modifications may be made in the device without departing from the teachings of the invention as defined in the following claims.

What is claimed is:

1. A teaching device comprising a first member having thereon both increments of information arranged in a preselected pattern and sequence and correct answer reinforcement indicium, and a second member adapted to be superimposed on said first member and having spaced viewing means formed therein, at least one of said viewing means enabling a selected increment of information on the first member to be seen while at the same time masking the non-selected increments from view, said at least one of said viewing means having indicia adjacent thereto which are selectively correlateable with the increments of information on the first member, another of said viewing means formed in the second member enabling the correct answer reinforcement indicium on the first member to be seen upon proper correlation of any one of the increments of information on the first member with the indicia adjacent to said at least one of the viewing means formed in the second member.

2. A teaching device according to claim 1 wherein said viewing means of the second member comprises a plurality of windows arranged in a preselected pattern about an orientation window, said orientation window having indicia along each of its margins which are selectively and sequentially correlateable with the increments of information on the first member.

3. A teaching device according to claim 2 wherein the orientation window of the second member of the teaching device is larger than the other windows therein, and each margin of the orientation window, on the front and the back of said second member, has indicia therealong which corresponds to the arrangement of the increments of information on the first member of the teaching device.

4. A teaching device according to claim 1 wherein the first member comprises a worksheet portion and student guide portion which is separable from the worksheet portion, said worksheet portion having a grid formed thereon consisting of aligned rows of boxes in some of which words are arranged in a preselected pattern, said student guide portion having the words appearing in said boxes of the grid on the worksheet portion arranged in a preselected sequence thereon, the sequence of the words on the student guide portion corresponding to the indicia associated with said at least one means on the second member of the teaching device.

5. A teaching device according to claim 4 wherein the worksheet portion has a second grid formed thereon consisting of aligned rows of boxes in some of which letters comprising the words on the student guide portion are arranged in a preselected pattern, said second grid including on orientation zone for enabling a student to properly orient the second member of the teaching device on the second grid.

6. A teaching device according to claim 4 wherein the worksheet portion has spaces arranged thereon in a sequence which corresponds to the sequential arrangement of the words on the student guide portion for enabling a student to write each word in sequence as it is read from the student guide portion.

7. A teaching device according to claim 4 wherein the worksheet portion has imprinted thereon sentences consisting of the words arranged on the student guide portion.

8. A teaching device according to claim 1 wherein the first member is provided with a grid comprised of boxes in preselected ones of which increments of information are arranged, one of said boxes of the grid having indicia therein for providing immediate visible correct answer inforcement upon proper superimposition of the second member upon the first member by a student.

9. A hand manipulable teaching device comprising a lesson sheet having a worksheet portion and an audio strip portion which is separable from the worksheet portion, and a window card adapted to be superimposed on the worksheet portion of the lesson sheet, said audio strip portion of the lesson sheet having increments of information sequentially arranged thereon, said worksheet portion of the lesson sheet having the same increments of information which appear on the audio strip arranged thereon in a preselected pattern and including correct answer reinforcement indicia, said window card having a plurality of windows therein arranged in a preselected pattern with relation to a guide window having the indicia along each of its margins which corresponds to the sequential arrangement of the increments of information on the audio strip, at least one window of the window card, other than the guide window, enabling said correct answer reinforcement indicia on the worksheet to be seen when a correct correlation has been made between the indicia along a margin of the guide window and an increment of information on the worksheet portion.

10. A teaching device according to claim 9 wherein the worksheet portion of the lesson sheet has the elements only of the increments of information on the audio strip portion arranged thereon in a separate, different preselected pattern, and is provided with a window orientation zone for enabling the guide window of the window card to be properly oriented on the worksheet whereby upon correct correlation between the indicia along a margin of the guide window and an increment of information on the audio strip, the elements comprising said increment of information will appear in proper sequence in separate windows of the window card.

* * * * *